United States Patent [19]

Carlsson et al.

[11] 4,300,730

[45] Nov. 17, 1981

[54] DISENGAGEABLE LOCKING MECHANISM IN A FISHING REEL

[75] Inventors: Karl L. Carlsson, Asarum; Bertil E. Tansson, Karlshamn, both of Sweden

[73] Assignee: Abu Aktiebolag, Sweden

[21] Appl. No.: 163,603

[22] Filed: Jun. 27, 1980

[30] Foreign Application Priority Data

Jul. 2, 1979 [SE] Sweden .................................. 7905746

[51] Int. Cl.³ ...................... A01K 89/01; A01K 89/02
[52] U.S. Cl. .................................. 242/84.2 R; 74/576; 74/577 SF; 188/82.4; 242/84.5 R
[58] Field of Search ...................... 242/84.2 R, 84.2 A, 242/84.1 R, 84.21 R, 84.21 A, 84.5 A, 84.5 R, 84.51 A, 84.51 R; 188/82.4, 82.3, 82.34; 74/576, 577 SF

[56] References Cited

U.S. PATENT DOCUMENTS

| | | | |
|---|---|---|---|
| 1,935,414 | 11/1933 | Raber | 188/82.4 X |
| 3,075,721 | 1/1963 | Sarah | 188/82.4 X |
| 3,540,306 | 11/1970 | Nurmse | 74/576 |
| 3,946,963 | 3/1976 | Oberg | 242/84.21 R |
| 3,974,978 | 8/1976 | Henze | 242/84.1 R |

*Primary Examiner*—Billy S. Taylor
*Attorney, Agent, or Firm*—Karl W. Flocks

[57] ABSTRACT

In fishing reels, more particularly non-rotary type reels, there is provided a device comprising a disengageable anti-reverse mechanism in the form of a pawl and ratchet mechanism and being characterized by an actuating means operable by the hand crank of the fishing reel via a transmission rotatable by the crank, and by means of which the pawl of the anti-reverse mechanism is rockable between an operative anti-reverse position and an inoperative position in relation to the ratchet, depending on the direction in which the crank is rotated.

8 Claims, 5 Drawing Figures

DISENGAGEABLE LOCKING MECHANISM IN A FISHING REEL

The present invention relates to a device in fishing reels, particularly non-rotary type reels, which has rotatable parts, a hand crank and transmission means.

The anti-reverse mechanism in a non-rotry type reel comprises, such as disclosed in U.S. Pat. No. 3,540,306, a ratchet wheel which is driven by the hand crank via a transmission between the crank and the rotatable line pick-up means of the non-rotary type reel, and a spring biased pawl cooperating with the ratchet wheel and permitting rotation thereof and thus of the line pick-up means in one direction but locking against rotation in the opposite direction. It is previously known, for instance from Swedish Patent Specification 330,633, to use in fishing reels an anti-reverse mechanism which allows rotation in one direction of a transmission driven by the hand crank but which prevents rotation of the transmission by means of the hand crank in the opposite direction. The anti-reverse mechanism generally comprises a ratchet wheel and a spring-loaded pawl cooperating with the ratchet wheel. In conventional constructions, the spring-loaded pawl produces a certain noise when it drops into the tooth gaps of the ratchet wheel during rotation thereof in the allowed direction of rotation. It is however also known in a fishing reel of multiplier type to arrange the locking mechanism such that the spring-loaded pawl will be automatically disengaged when the ratchet wheel is rotated by means of the hand crank in the allowed direction of rotation. A construction of this type, as disclosed in U.S. Patent No. 1,991,407, to this end comprises a disengaging arm for pivoting the pawl to a disengaged position. The arm is riveted to the pawl and extends to the ratchet wheel upon which the arm reposes in frictional engagement via a function pad. When the line spool of the fishing reel is rotated by the hand crank in one direction and the ratchet wheel is rotated in the corresponding direction, friction between the ratchet wheel and the friction pad causes the pawl to be lifted away from the ratchet wheel against the action of a spring. The pawl is automatically re-engaged when rotation of the ratchet wheel in the reverse direction is initiated. By this arrangement, unnecessary wear of the locking mechanism and noise from it will be prevented when the ratchet wheel is rotated in the forward direction. In a modification of such a locking mechanism for a multiplying reel, as disclosed in U.S. Pat. No. 3,910,528, a spring wire is wound one turn about the hub of the ratchet wheel and is hooked with a free end portion in a slot in the pawl. When the ratchet wheel is rotated in the forward direction, the friction between the hub of the ratchet wheel and the spring will cause the free end portion of the spring to be extended and move the pawl out of engagement with the ratchet wheel. When the rotation of the ratchet wheel in this direction ceases, the free end portion of the spring will swing back, thus returning the pawl to the engagement with the ratchet wheel to prevent rotation in the reverse direction.

In these locking mechanisms, exclusively used for multiplying reels, the re-engagement between the pawl and the ratchet wheel is effected by substantially rigid engagement in which the ratchet wheel is abruptly arrested when engaging the end of the pawl. The force of impact of a tooth of the ratchet wheel against the pawl is substantially in the longitudinal direction of the pawl and the force of engagement at the pawl is transmitted to the pivot shaft of the pawl in a completely non-elastic way and at right angles to it, whereby in course of time the engaged end of the pawl and the teeth of the ratchet wheel tend to be damaged. Moreover, there is a risk that the sudden abrupt engagement of the pawl will produce a recoil such that the ratchet wheel is accelerated unintentionally from stop position in the direction opposite the reverse direction, that is in a forward direction, in the moment of re-engagement, whereby the line spool is also accelerated from a stop position, thereby causing entangling of the line on the spool. These disadvantages may to some extent be reduced by the use of a ratchet wheel with a small distance between the teeth and a pawl with a short travel between positions of engagement and disengagement, and by the use of a weak loading spring, this however making the construction less robust and more liable to damage and functional disturbances.

The primary object of the invention is to provide a silent anti-reverse mechanism for a fishing reel, and a further object is to overcome the above-discussed drawbacks by providing an anti-reverse mechanism in which automatic reengagement occurs elastically.

Another object of the invention is to provide an anti-reverse mechanism which ensures safe function and gentle engagement of the pawl and the ratchet wheel even when use is made of a ratchet wheel having only a few teeth, for instance a single tooth.

Still another object of the invention is to provide an anti-reverse mechanism of the above-defined type which is automatically disengaged by friction but is substantially independent of friction with the ratchet wheel itself and in which the friction for disengagement is produced between a rotary member and an actuating mechanism spaced apart from the pawl and the ratchet wheel.

According to another aspect of the invention, said pivot means connecting said link arm and said clutch member in a pivot and restricted lost motion connection comprises a pin and slot assembly, and said elastic connecting means comprises a tension spring connected between one of said pawl and said link arm, said pin and slot assembly and said spring, when said rotational part is rotated in one direction and imparts a sufficient frictional force to said clutch member to rock the latter, being adapted to transmit, after a restricted lost motion in said pin and slot assembly against the action of said spring without shifting said pawl from its disengaged or its engaged position, a rocking movement via said link arm to said pawl for shifting the latter between said operative and inoperative positions, whereby said actuating means automatically affect said shifting of the pawl upon rotation of the hand crank in either direction but after a slight play in order to prevent small unintentional movements in the transmission and of the crank from causing unintentional shifting of said pawl.

According to still another aspect of the invention, said device comprises an auxiliary actuating means for said pawl, said auxiliary actuating means comprising an operating knob mounted on the outer side of the fishing reel, and an operating arm actuable by said knob and by means of which said pawl is positively rockable to and retainable in an inactive position with respect to said ratchet, whereby said actuating means operable by the hand crank can be made inoperative, when so desired.

In a non-rotary type reel of this kind, it is however also desirable to solve certain problems which can be disregarded in prior art non-rotary type reels. The following examples serve to illustrate these problems.

An ordinary line pick-up means in fixed type reels is in the form of a hoop or bail which at the end is pivotally connected to a rotor rotated by the hand crank and which by pivotal movement is shiftable between a line pick-up position and a casting position in which the line is free for casting. When, after a cast, the line is wound up on the spool by the rotation of the rotor with the bail, the line runs over a guide at one end of the bail adjacent an arm which connects this end of the bail to the rotatable member.

In order to make it easy to catch the line by the fingers of the hand holding the rod, the line guiding means of the bail should be as close to the rod as possible, i.e. between the rod and the line spool, but when the rotor stops, the bail guide can have any angular position around the spool. If the conventional anti-reverse mechanism is in operation, the rotor with the bail can be rotated by means of the crank only through an insignificant angle in the reverse direction before this movement is stopped. The adjustment of the bail by means of the crank, therefore, can be carried out only in the normal direction of rotation of the bail, and the fisherman must check the adjustment of the bail with his eyes or his fingers. In both cases, a certain amount of mental concentration is required which during fishing might be better used for other purposes.

In order to ensure rapid and safe setting of the bail in the desired casting position without it being necessary for the fisherman to check the setting with his fingers or eyes to carry out any necessary adjustments, the pawl and the ratchet can be arranged with respect to each other in such a way that the ratchet and the rotatable member carrying the bail, irrespective of their angular position of departure, will always be stopped in the correct position when the pawl enters into locking engagement with the ratchet. To this end, the simplest way is to utilize a ratchet which has only one tooth or equivalent stop. The ratchet may then however be rotated in the reverse direction one revolution before it is locked in that the pawl drops into locking engagement with the ratchet. If the angular movement of the rotating mass is relatively substantial before the pawl engages the ratchet and interrupts the movement, the impact of the pawl against the ratchet may be so considerable that the locking mechanism is damaged. After some time, such impacts may also cause damage to other parts of the fishing reel. When the anti-reverse mechanism is automatically actuated by means of the device according to the present invention, the rotating mass, in some cases, may be forcibly accelerated by means of the crank to a relatively high speed before the movement is stopped, which may cause damage as defined above and might deteriorate the automatic function.

In order to solve this problem, the device of the invention, according to one aspect thereof, has elastic damping means associated with said pawl for damping the engagement of the pawl with a ratchet tooth.

According to another aspect of the invention, the elastic damping means is in the form of a resilient tongue carried by said pawl.

According to a further aspect of the invention, the resilient tongue is integrated with said pawl in that the pawl consists of two pawl-shaped parts, one of said pawl-shaped parts being made of elastic material and forming a resilient tongue connected to the other part of the pawl and bent outwardly therefrom such that said resilient tongue, when the pawl is brought into engagement with said ratchet, is the first part of the pawl to be engaged by a ratchet tooth and thereby to be bent resiliently in the direction of said other part, said other part forming a support for the part which acts as a resilient tongue.

According to still another aspect of the invention, the damping means is in the form of an elastic cushion carried by a stationary part of the fishing reel and forming an elastic abutment for the pawl when the latter engages a ratchet tooth to ensure anti-reverse locking engagement.

According to still further aspect of the invention, the cushion has a convex abutment surface for said pawl for providing a progressively acting shock absorbing characteristic.

The invention will be described in greater detail hereinbelow with reference to the accompanying drawings, in which:

FIGS. 1 and 2, in side elevation, show a preferred embodiment of an anti-reverse mechanism according to the invention with a device for the automatic engagement and disengagement of the pawl by rotation of the crank in one or the other direction, and with a damping spring for the pawl, FIG. 1 showing the pawl when disengaged and FIG. 2 showing the pawl when engaged;

Figure 1:
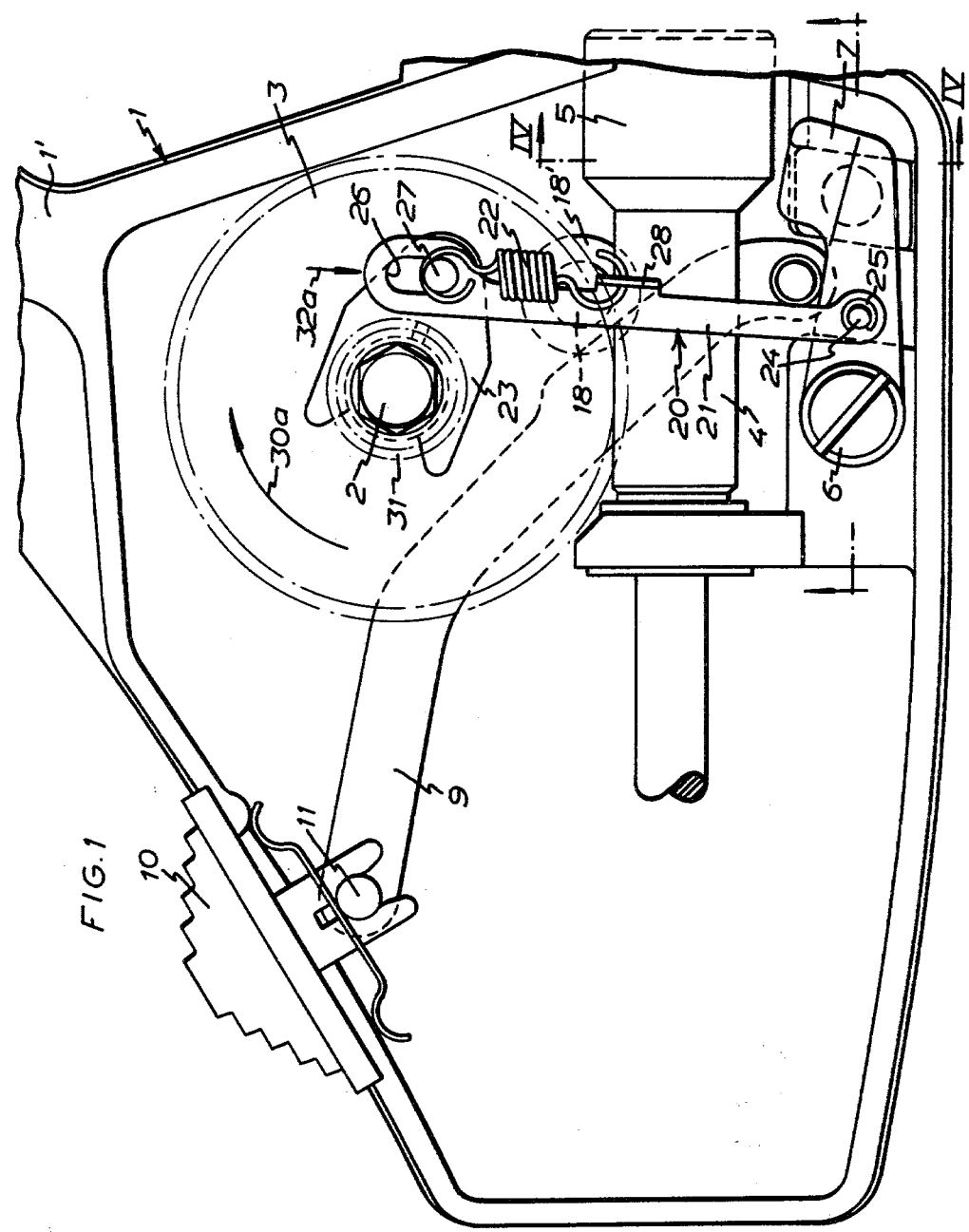

In FIG. 1, there are shown at 1 a portion of the frame and at 1' a portion of the foot of a non-rotary type reel in which a helical spur gear 3 rotatable via a shaft 2 by means of the crank (not shown) meshes with a worm 4 for driving a ratchet 5 and a rotatable member supporting a line wind-up component (not shown), such as a bail or any other line pick-up member having a guide surface on which the line runs when being wound up on the line spool.

Figure 2:
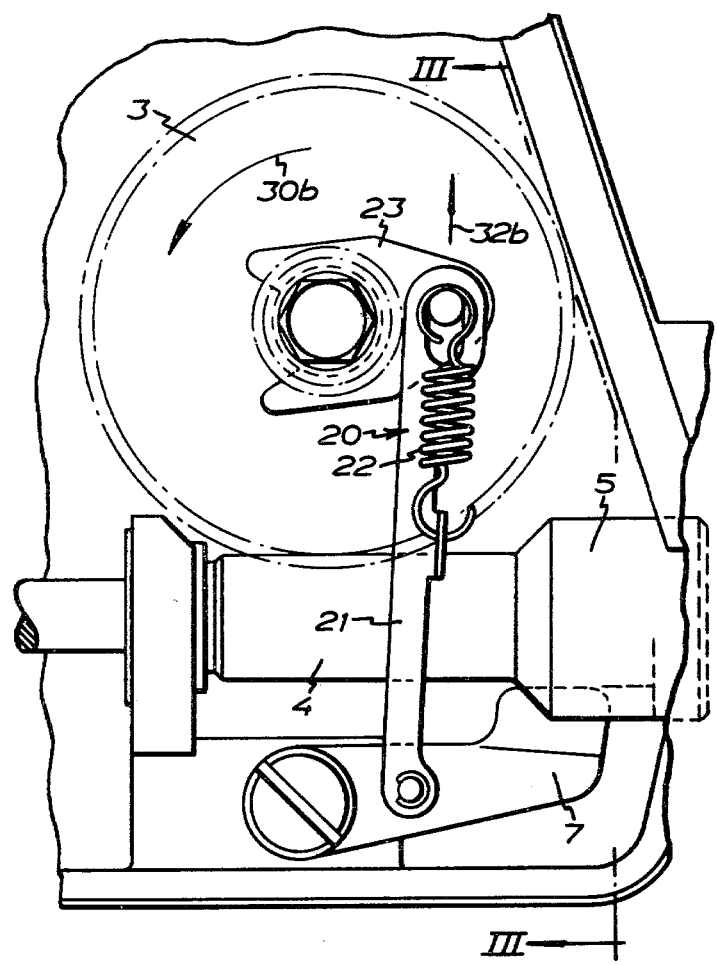

A pawl 7 pivotally mounted with respect to the frame 1 on a bolt or journal 6 cooperates with the ratchet 5. If so desired, the non-rotary type reel may, as previously known in the art, have an operating arm 9 which can be actuated by means of an operating knob 10 displaceably mounted on the outer side of the frame 1, by an articulation 11 between the arm 9 and the knob 10 for positive rotation of the pawl to an inactive position with respect to the ratchet 5. The device of the present invention has however made it possible to dispense with this arrangement and replace it by an automatically acting mechanism. This mechanism is shown in FIGS. 1–3 and will be described in greater detail hereinbelow, but first, in order to elucidate a few specific problems, a preferred embodiment of the ratchet and the pawl will be described.

Figure 3:
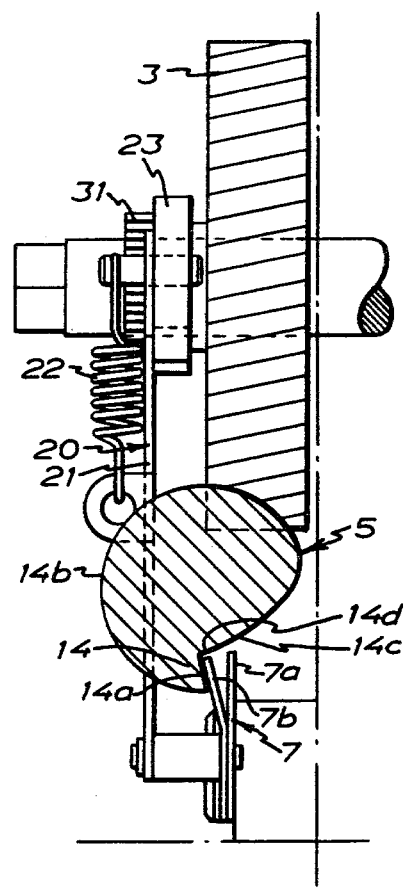
FIG. 3 is a section taken along the line III—III in FIG. 2.
Figure 4:
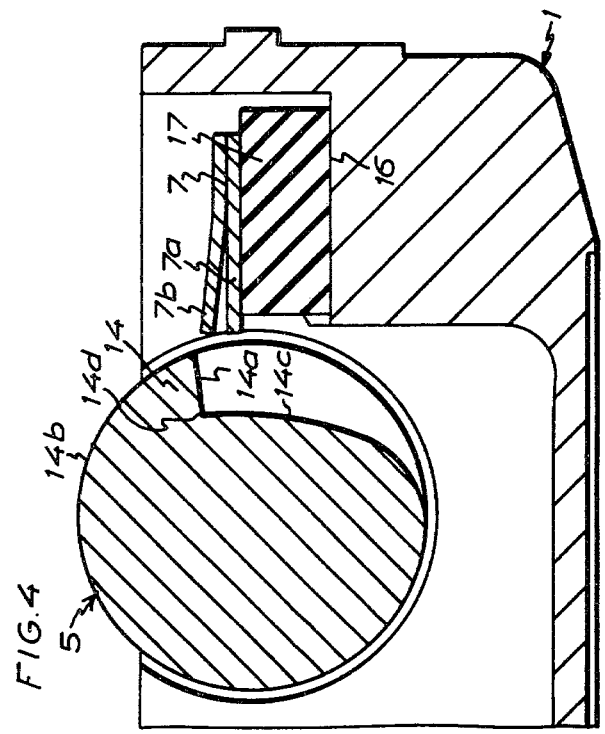
FIGS. 4 and 5 show modified embodiments of the damping spring in sections taken along the lines IV—IV and V—V, respectively, in FIG. 1.

As best shown in FIGS. 3 and 4, the ratchet 5 of the preferred embodiment has only one tooth 14 whose back side extends from a tooth crest 14a rearwardly in a curved configuration which along a first section 14b, as counted from the tooth crest 14a, may be substantially circular and merges into a second section 14c which along a helical curved path extends to the base (the bottom of the tooth gap) 14d of the tooth 14.

In the shown embodiment of the tooth, the tooth flank between the crest 14a and the bottom 14d of the tooth is substantially radial and set at such an angle that the ratchet 5 is arrested with a line pick-up means (generally a rotor with a line pick-up bail) rotatable with the ratchet, in such a position that a guide surface of the line pick-up means in this stop position is located between the line spool (whose longitudinal axis coincides with the common longitudinal axis of the worm 4 and the ratchet 5) and the foot 1' (to be mounted on a fishing rod) of the reel. As appears from FIGS. 1 and 2, the pawl 7 extends substantially in the direction of the axis of the ratchet 5. If the pawl 7 is maintained in engagement with the ratchet when the hand crank is rotated for driving the worm 4, the ratchet 5 and the rotor with the line pick-up means in the winding-up direction (anticlockwise in FIGS. 3 and 4), the pawl 7 can slide on the continuous cam surface 14b–14c of the tooth 14 and for each revolution of the gear wheel, it drops from the tooth crest 14a to the tooth bottom 14d without preventing the rotation of the ratchet. When the parts 4 and 5 are rotated in the opposite direction (i.e. clockwise in FIG. 4), the ratchet 5 will be arrested as soon as the abutment surface of the tooth 14 between the tooth crest 14a and the tooth bottom 14d reaches the front side of the pawl 7.

In conventional constructions, the pawl is maintained in abutment against the ratchet by means of a spring. During retrieval of the line, a disturbing snapping noise will then be produced every time the pawl drops to the position shown in FIG. 3, and to avoid this noise non-rotary type reels are usually equipped with a disengagement device for the anti-reverse mechanism, such as the device 9–11 of FIG. 1, which is left out in FIG. 2 to indicate that it is not needed in the device of the reel according to the invention as described hereinbelow. The device for manual disengagement of the anti-reverse mechanism is disadvantageous in so far as it must constantly be operated during fishing if one does not want to hear the noise from the anti-revrse when retrieving the line. Sometimes, the fisherman forgets to engage the anti-reverse when it is needed.

According to the invention, the pawl 7 can be disengaged and engaged by means of an automatic actuating mechanism which is generally designated 20. As will be evident from the following description, the locking knob 10 and the anti-reverse arm 9 with associated parts may be dispensed with and entirely replaced by the mechanism 20.

The mechanism 20 comprises a link arm 21, a tension spring 22 and a fork 23 whose shanks straddle the shaft 2 of the worm gear 3 and which is in a slight frictional engagement with the shaft 2 and/or with a surface of the gear wheel.

The link arm 21, at opposite ends, is articulated and readily dismountably connected to the pawl 7 and the fork 23, respectively. To ensure the articulation to the pawl 7, this carries a pin 24 engaging in a hole in the link arm 21 which is retained on the pin 24 by means of a C-shaped locking ring 25. At the opposite end portion, the link arm 21 has an enlongated hole 26 in which engages a pivot pin 27 fixed on a rear portion of the fork 23. The articulation at this end of the arm 21 thus also permits displacement of the arm 21 with respect to the pin 27 within the limits of the extension of the hole 26 in the longitudinal direction of the arm. The spring 22 which is a helical tension spring is mouned between the pin 27 and a spring attachment 28 on a central portion of the link arm 21. The spring 22 tends to shorten the distance between the spring attachment 28 and pin 27 and thus, by the pin 27, to pivot the fork 23 in the direction of the pawl 7. At the same time, the spring 22, by the link arm 21, tends to pivot the pawl 7 in the direction of the ratchet 5 and is able to do so when the gear 3 is not driven for retrieval of the line, i.e. when the line pick-up means is not rotated by means of the crank of the reel via the gear wheel 3 and the worm 4.

In FIG. 1, the mechanism 20 is shown in a position where the pawl is in a free position which it is caused to assume when the gear wheel 3 is rotated in the direction indicated by the arrow 30a for retrieval of the line. A torque is then acting in the clockwise direction on the fork 23 which, as earlier mentioned, engages under a slight friction with the shaft 2 and/or, possibly, with surfaces of the gear wheel, of a spacer ring or of a further gear wheel 31 which is mounted on the shaft 2 and prevents displacement of the fork 23 in the direction of the axis of the shaft 2. Thus, in the rotational direction 30a of the gear wheel 3 (during retrieval of the line) as indicated in FIG. 1, the fork 23 by the friction coupling to the gear wheel 3 will be given a moment of oscillation acting on the pivot pin 27 of the fork in the direction indicated by the arrow 32a. The oscillatory movement of the fork 23 in this direction occurs with the assistance of the spring 22 and ceases when the pawl 7 reaches its free outer end position (FIG. 1) in which the spring 22 is contracted to its shortest length and the pawl 7 is removed by the link arm 21 from its engagement with the ratchet 5 which may be of the design described above and shown in FIGS. 3–5.

When the crank of the reel is rotated in the opposite direction, i.e. against the direction of winding-up, so that the gear wheel 3 rotates in the direction indicated by the arrow 30b in FIG. 2, the anti-reverse mechanism will be automatically engaged and further rotation will be prevented in that the frictional engagement between the gear wheel shaft 2 and the fork 23 will cause the fork to pivot anti-clockwise against the action of the spring 22. When the pin 27 of the fork has reached the upper end position, shown in FIG. 2, in the elongated hole 26 in the link arm 21, the link arm 21 will then be pulled in the direction indicated by the arrow 32b in FIG. 2 such that the pawl 7 is pivoted from the position in FIG. 1 to the position in FIG. 2, i.e. into engagement with the ratchet 5.

The elongated hole 26 in the link arm 21 and the tension spring 22 prevent the disengagement of the anti-reverse mechanism upon slight return movements of the transmission and thus of the fork 23, for instance on account of the resilience of the engagement of the pawl with the ratchet tooth surface 14a. Such return motion may occur during normal fishing and is permitted in that the fork, within the limits set by the elongated hole 26, can move back and forth with and against the force of the spring 22 without affecting the pawl. However, when, for instance, the line pick-up means (rotor with bail) is rotated through a sufficient angle in the reverse direction, the anti-reverse mechanism will be automatically engaged, and a fish may then take the line only against the action of the drag or fricton brake with which non-rotary type reels are normally equipped.

As appears from FIG. 3, the ratchet 5 can be rotated by means of the crank not more than one revolution in the clockwise direction before the radial tooth flank surface engages the front surface of the pawl 7. Therefore, under unfavourable circumstances, the rotating mass can be forcibly accelerated by the crank and attain a relatively high speed before the engagement occurs and so, the impact may become relatively heavy.

In the embodiment of FIGS. 1–3, the engagement of the anti-reverse mechanism, i.e. the engagement of the pawl 7 with a ratchet tooth, is damped by a damping spring which is integrated with the pawl 7. As shown in FIG. 3, the pawl consists of two parts 7a, 7b both of which have substantially the same configuration. The main portion 7a forms a support for the other part 7b which is bent laterally from the main part 7a to form a resilient tongue which the radial surface 14a (FIG. 3) of the ratchet tooth 14 will first engage when the pawl 7 drops into engagement with the ratchet 5. Thus, the locking engagement occurs gently on account of resilient damping and in exactly the right angular position, such that a fishing line captured by a line pick-up means, for instance a bail, can be conveniently seized by the fingers without it being necessary for the fisherman to check the setting and carry out corrections. Thus, in preparation of a cast, the crank may, if necessary, be turned in the reverse direction, whereby the locking mechanism is automatically engaged and the rotor with the line pick-up bail automatically assumes the correct position to permit seizing the line in the most convenient way. The engagement is silent, gentle and spares both the locking mechanism and the transmission by the action of the spring 7b.

Figure 5:
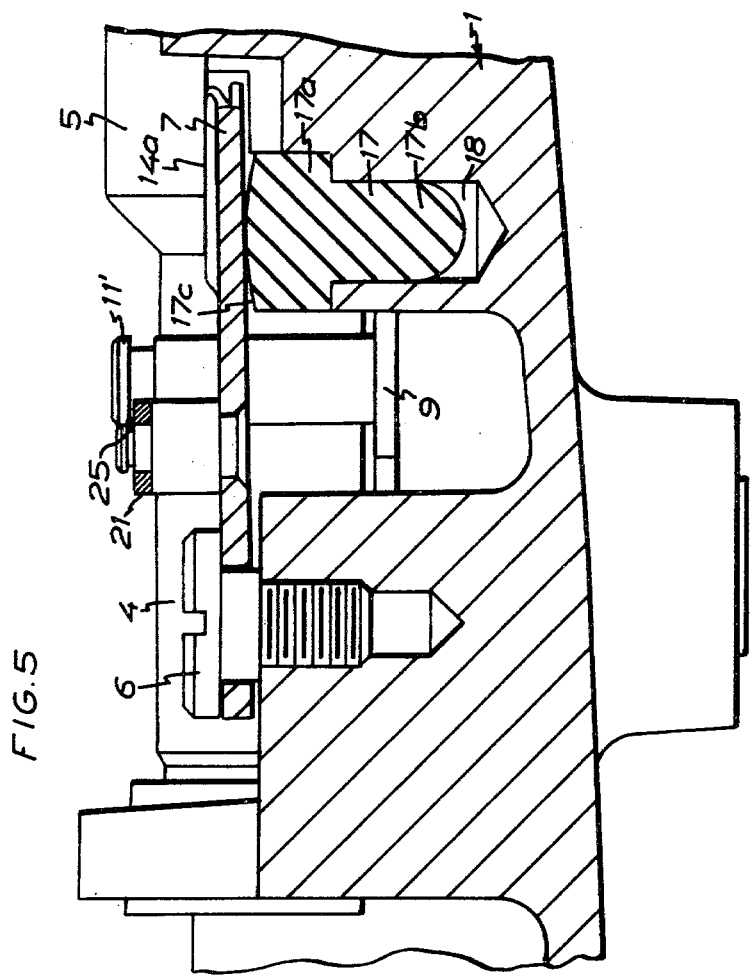

As shown in FIGS. 4 and 5, it is possible to replace or supplement the resilient pawl 7 with a damping device consisting of a cushion 17 of an elastic rubber material for damping the engagement of the pawl. The cushion 17 is disposed between the rear side of the pawl and a frame surface 16 (FIG. 4).

The cushion 17 may be in the form of a plug with a head 17a and a shaft 17b which may be cylindrical and is inserted under pressure in a bore or any other recess 18 in the frame 1 and which maintains the cushion 17 releasably in place. The side 17c of the cushion that faces the pawl 7 may be domed, as appears from FIG. 5, to give the damping a progressive effect.

As an alternative of the embodiment in FIGS. 4 and 5 where the damping cushion 17 is disposed on a supporting surface or is designed as a plug inserted in a recess in the frame 1, it is possible to connect the damping cushion to the pawl to act between the pawl and the frame in an equivalent fashion. A conceivable modification of the embodiment in FIGS. 4 and 5 is to connect the damping cushion to the journal 6 and to mount the pawl on the damping cushion. To ensure the connection of the damping cushion to the part which is to carry it, it is possible to use many methods other than those shown above, for instance gluing and vulcanization.

It is also possible to use a damping device according to the invention for a locking mechanism with a ratchet having several teeth, for instance a mechanism used as an additional locking mechanism in a non-rotary type reel with a device of the type shown in FIGS. 1 and 2, for setting the line pick-up member, such as a bail, in casting position.

The invention is not restricted to the above-defined embodiments but may be conveniently adapted to provide for the automatic engagement and disengagement of an anti-reverse mechanism for other members driven by the crank via a transmission. As to the individual component parts, the invention is not restricted to the above-defined preferred embodiment but may be modified in different ways within the spirit and scope of the accompanying claims.

What we claim and desire to secure by Letters Patent is:

1. In a fishing reel having rotatable parts, a hand crank and transmission means comprising a plurality of rotatable members and connected to be driven by the hand crank and to rotate said parts, a device comprising a disengageable anti-reverse mechanism for a rotatable member, such as a line pick-up member in a non-rotary type reel, said rotatable member being rotatable by said hand crank via said transmission means (2, 3, 4), said anti-reverse mechanism comprising a ratchet (5) rotatable by means of the hand crank, a pawl (7) and an actuating means (20) for shifting said pawl between an operative position for cooperation with said ratchet and a free position in relation to said ratchet, said ratchet, in the operative position of the pawl (7), being rotatable in a first rotational direction but being locked by the pawl against rotation in a second opposite direction of rotation, said actuating means (20) comprising a link arm (21) connected at one end to the pawl, and a friction clutch means frictionally actuated by one of said rotatable parts of the fishing reel and connected to said link arm for pivoting the pawl out of engagement with said ratchet when driven by the hand crank; said friction clutch means comprising a clutch member connected in a sliding clutch engagement to one of said rotatable transmission members, pivot means (26, 27) connected to said link arm (21) at the other end of the latter to said clutch member (23) in a manner to permit pivotal movement and a restricted lost motion therebetween, and elastic means (22) connecting said clutch member and said link arm and yieldably acting against any lost motion between said link arm (21) and said clutch member, whereby said link arm and said pawl in said operative position of the latter in engagement with said ratchet (5) permits a restricted rotational movement back and forth of said clutch member (23) without causing any shifting of said pawl.

2. A device as claimed in claim 1, wherein said pivot means connecting said link arm (21) and said clutch member (23) in a pivot and restricted lost motion connection comprises a pin and slot assembly (27, 26), and wherein said elastic connecting means comprises a tension spring (22) connected between one of said pawl (7) and said link arm (21), said pin and slot assembly and said spring, when said rotational part is rotated in one direction and imparts a sufficient frictional force to said clutch member to rock the latter, being adapted to transmit, after a restricted lost motion in said pin and slot assembly against the action of said spring (22) without shifting said pawl (7) from its disengaged or its engaged position, a rocking movement via said link arm (21) to said pawl for shifting the latter between said operative and inoperative positions, whereby said actuating means automatically affect said shifting of the pawl upon rotation of the hand crank in either direction but after a slight play in order to prevent small unintentional movements in the transmission and of the crank from causing unintentional shifting of said pawl (7).

3. A device as claimed in claim 1, wherein an elastic damping means (7b; 17) is associated with said pawl for damping the engagement of the pawl (7) with a ratchet tooth (14).

4. A device as claimed in claim 3, wherein said elastic damping means is in the form of a resilient tongue (7b) carried by said pawl (7).

5. A device as claimed in claim 4, wherein said resilient tongue (7b) in integrated with said pawl (7) in that the pawl (7) consists of two pawl-shaped parts (7a, 7b), one of said pawl-shaped parts being made of elastic material and forming a resilient tongue connected to the other part of the pawl and bent outwardly therefrom such that said resilient tongue, when the pawl is brought into engagement with said ratchet, is the first part of the pawl to be engaged by a ratchet tooth (14) and thereby to be bent resiliently in the direction of said other part (7a), said other part (7a) forming a support for the part (7b) which acts as a resilient tongue.

6. A device as claimed in claim 3, wherein said damping means is in the form of an elastic cushion (17) carried by a stationary part of the fishing reel and forming an elastic abutment for the pawl (7) when the latter engages a ratchet tooth (14) to ensure anti-reverse locking engagement.

7. A device as claimed in claim 6, wherein said cushion (17) has a convex abutment surface for said pawl (7) for providing a progressively acting shock absorbing characteristic.

8. A device as claimed in claim 2, wherein said device comprises an auxiliary actuating means for said pawl (7), said auxiliary actuating means comprising an operating knob (10) mounted on the outer side of the fishing reel, and an operating arm (9) actuable by said knob and by means of which said pawl (7) is positively rockable to and retainable in an inactive position with respect to said ratchet (5), whereby said actuating means (20) operable by the hand crank can be made inoperative, when so desired.

* * * * *